Patented Apr. 22, 1930

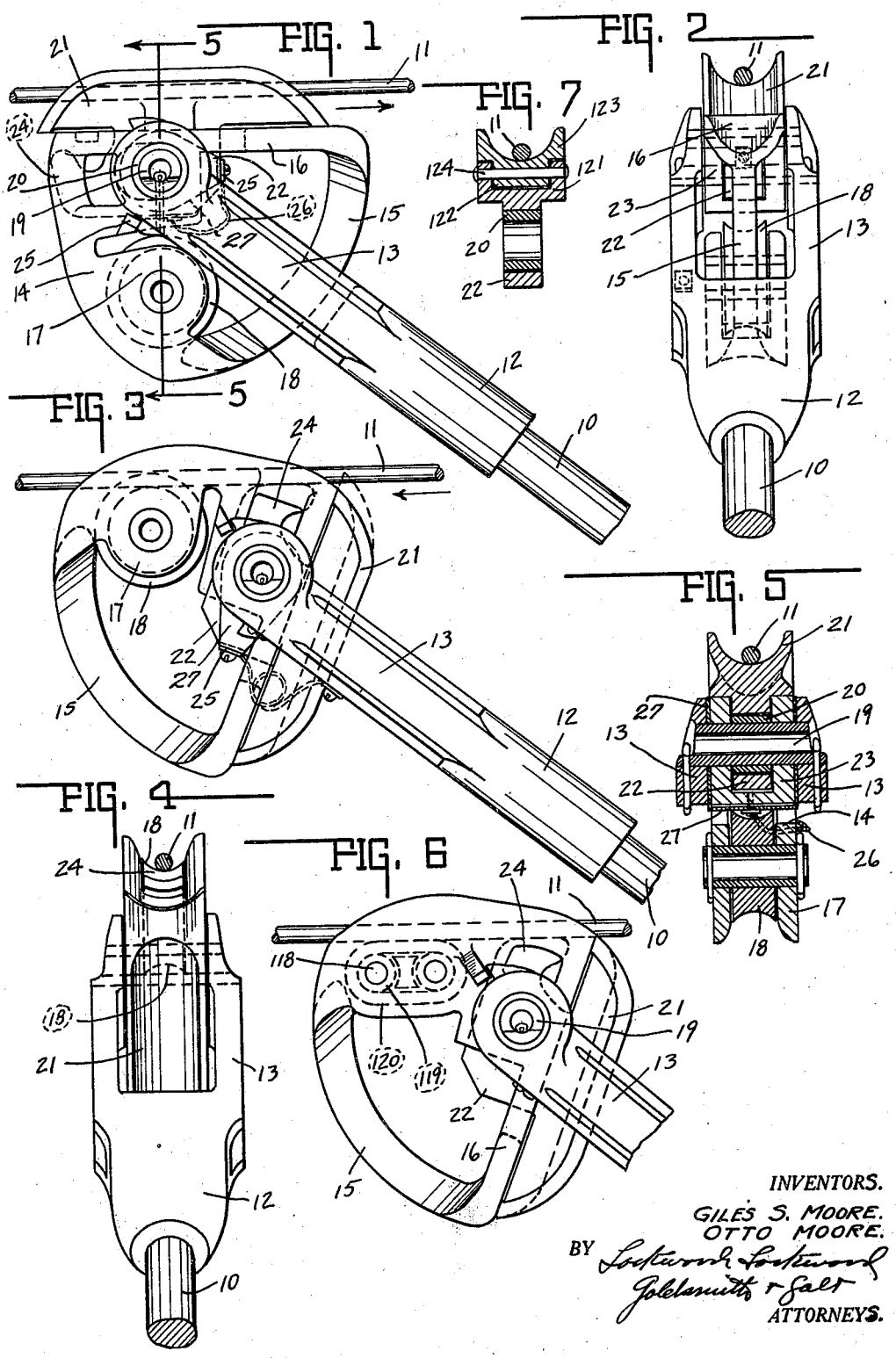

1,755,303

UNITED STATES PATENT OFFICE

GILES S. MOORE, OF INDIANAPOLIS, AND OTTO MOORE, OF FRANKFORT, INDIANA

SLIDING TROLLEY

Application filed December 22, 1928. Serial No. 327,778.

This invention relates to a trolley shoe for use in connection with vehicles electrically driven from an overhead trolley wire, and particularly to the arrangement and construction thereof for facilitating the action of the shoe with respect to the trolley wire in the reversed movements of the vehicle.

One feature of the invention resides in the sliding shoe contact with a trolley wire when the vehicle is moving forwardly so as to have a greater surface of contact with the trolley wire than is usual with the ordinary trolley wheel, wherein said shoe is capable of having relative movement with respect to the pivotal mounting thereof so as to vary the leverage of the mounting to facilitate a partial rotation thereof upon the vehicle being reversed.

Another feature of the invention resides in the association with the sliding shoe contact of a joint rotative and elongated contact adapted to be brought into engagement with the trolley wire upon the reversed movement of the vehicle and the pivotal movement of the support. By reason thereof, an elongated contact with the trolley wire is had with the advantages inherent therein, while the rotative action is adapted to prevent sticking by reason of the relative position between the wire and trolley pole. Without the rotative action, since the trolley pole is directed at an angle to the trolley wire, there would be danger of the trolley pole forcing the wire upwardly, thereby causing breakage. But by reason of the rotative action, such pushing movement would cause a rolling action to occur which would prevent it from being pushed upwardly.

Another feature of the invention resides in the particular arrangement and position of the shunt for carrying the current from the shoe to the harp.

Other features of the invention will be more fully set forth and described in the following specifications and claims.

The full nature of the invention will be more fully understood from the accompanying drawings and the following description and claims.
Fig. 1 is a side elevation of the trolley when the vehicle is moving forwardly. Fig. 2 is a front elevation thereof. Fig. 3 is the same as Fig. 1 showing the reversed position of the trolley when the vehicle is moving rearwardly. Fig. 4 is a rear elevation thereof. Fig. 5 is a section taken on the line 5—5 of Fig. 1. Fig. 6 is the same as Fig. 3 showing a modified form of the reversing shoe. Fig. 7 is a section through the main shoe showing the mounting thereof for replacement.

In the drawings there is shown a trolley pole 10 and a trolley wire 11. The pole 10 is mounted in the usual manner on the top of a vehicle such as a street car or the like and extends rearwardly and upwardly at an angle as is well known in the art. Mounted upon the pole there is a trolley harp 12 provided with the arms 13 which provide a bifurcated carriage for supporting the trolley. Pivotally supported between the extreme ends of the arms 13 there is a trolley mounting 14 having an arcuate portion 15 on one side thereof, a shoe supporting face 16 adjacent thereto and a bearing 17 for a trolley wheel 18.

Said mounting is pivotally secured upon the pin 19 locked in position by the usual cotter pin or the like, and which is surrounded by a bushing 20 freely rotatable thereon. Slidably mounted upon the shoe supporting face 16 there is a main shoe 21 having substantial longitudinal dimensions and cupped in cross section to partially embrace the trolley wire and guide its sliding movement relative thereto. Said shoe has formed integral therewith a downwardly extending projection 22 which extends through a longitudinal slot in the shoe supporting face 16 and into the bifurcated pivotal mounting 23. Said bifurcated pivotal mounting 23 is rotatably mounted upon the pin 19 whereby the trolley mounting may freely swing about said pin.

The bushing 20, acting in the nature of a roller to minimize friction, surrounds the pin 19 and extends through the downwardly extending projection 22 of the sliding shoe 21, the opening in said projection being elongated so that said shoe will be anchored upon the shoe supporting face 16 by reason of the pin, and freely slide longitudinally of said face on said pin. As shown in Fig. 3, the normal position of the shoe is indicated in dotted lines, and its position when the mounting is rotated into reversed position is shown in full lines.

Said shoe has an auxiliary or reverse shoe 24 formed integrally on the rear end thereof and having a wire engaging surface extending at substantially right angles to the main shoe and in line with the trolley wheel 18, whereby said auxiliary shoe 24 and the wheel 18 engage the trolley wire jointly when the vehicle is reversed, as illustrated in Figs. 3 and 4.

By reason of this construction, when the vehicle is moving forwardly the frictional resistance between the shoe 21 and the trolley wire maintains said shoe in rearward position with respect to the trolley mounting as shown in Fig. 1. This position of the shoe with respect to the trolley mounting is such as to hold it in proper position with respect to the harp wherein the stop member 25 abuts the same and maintains the proper relative positions therebetween. Upon the vehicle being driven in the reverse direction, the frictional resistance between the shoe and wire will force the shoe forwardly in its sliding relation with the trolley mounting, thus overbalancing the same or altering the leverage and more readily causing said mounting to swing forwardly about the pin 19, thus presenting the auxiliary contact 24 to the trolley wire.

The frictional resistance of the auxiliary contact will tend to further swing the trolley mounting forwardly about the pin until the trolley wheel 18 is brought into contact with the wire. Thereupon, a continued rearward movement of the vehicle causes the joint contact of the wheel and the auxiliary shoe, thus maintaining a sliding shoe engagement with the wire. The rotative action of the trolley wheel will prevent the elongated sliding auxiliary shoe 24 from sticking and breaking the trolley, the wire or its mounting by reason of the component forces exerted thereon due to the angular direction and movement of the trolley pole. Therefore, by reason of this joint arrangement of the auxiliary shoe and the wheel presenting a rotative and elongated contact, the advantages of the shoe are attained while at the same time protecting the action of the trolley by means of the wheel.

For shunting the current from the shoe to the trolley pole there is provided a cable 26 connected with the pole and at 25 with a U-shaped contact plate 27 which surrounds the mounting 23, said plate having arms extending between the arms 13 of the harp 12 and the trolley mounting through which the pivotal pin 19 extends, as illustrated in Fig. 5.

By means of this arrangement, a substantial contact surface is obtained between said U-shaped contact plate and the trolley, which surface is maintained in efficient electrical contact by reason of the relative movements between the arms 13 and the trolley mounting acting to maintain a clean contacting surface therebetween.

In the modified form illustrated in Fig. 6, in place of the auxiliary shoe 24 and the trolley wheel 18 positioned with respect to each other to maintain joint contact with the trolley wire, there is provided a pair of pivotal mountings 118 upon which the pulleys 119 are adapted to rotate, said pulleys supporting an endless current conducting belt or chain 120 which contacts with the trolley wire throughout substantially the entire distance from one pulley to the other. This construction maintains a substantial area of contact as in the case of the shoe, while the rotating movement of the pulleys prevent sticking in the same manner as above described with respect to the trolley wheel.

As illustrated in the modified form shown in Fig. 7, the shoe 121 is provided with a recess 122 in which the removable shoe plate 123 may be mounted and locked in position by a plurality of pins 124. This permits of the plate 123 being replaced upon the shoe when worn, thereby eliminating the necessity of replacing shoe as a whole.

The invention claimed is:

1. A device for making electrical contact with a trolley wire, including a trolley harp, a mounting pivotally supported on said harp, a contact shoe slidably secured to said mounting adapted to make contact with said wire when moved in one direction, and an auxiliary contact member supported on said mounting in position to make contact with said wire when moving in the opposite direction, said sliding shoe being so mounted as to slide with respect to said mounting upon a reversal of its movement for over-balancing said mounting and causing it to swing into position to present the auxiliary contact member to said wire.

2. A device for making electrical contact with a trolley wire, including a trolley harp, a mounting pivotally supported on said harp, a contact shoe slidably supported on said mounting adapted to make contact with said wire when moved in one direction, an auxiliary shoe having a contact surface extending substantially at right angles thereto, and a trolley wheel in position to engage the trolley wire jointly with said auxiliary shoe when moved in the opposite direction, said contact shoe being adapted to slide to overbalancing position for presenting said auxiliary shoe and wheel to the trolley wire when moved in said opposite direction and returned to balancing position by the sliding action thereof upon the trolley being moved in the first mentioned direction.

3. A device for making electrical contact with a trolley wire, including a trolley harp, a mounting pivotally supported on said harp having an elongated slot in one face thereof, a contact shoe slidably mounted on said face and having a projection extending through said elongated slot provided with an elongated opening surrounding the pivotal support of said mounting, an auxiliary shoe extending rearwardly from said projection at substantially right angles to said contact shoe, and a trolley wheel rotatably supported in said mounting below said auxiliary shoe, said contact shoe being caused to slide rearwardly on said mounting when the trolley moves forwardly for maintaining a balanced position thereof, and forwardly on said mounting to overbalance the same when the trolley is moved rearwardly, thereby causing said auxiliary shoe and trolley wheel to be brought into contact with said wire.

4. A device for making electrical contact with a trolley wire, including a trolley harp, a mounting pivotally supported on said harp, a contact member secured on said mounting adapted to make contact with said wire, a U-shaped conducting plate mounted upon the pivotal support between and in electric contact with said harp and mounting, and an electric cable connecting said plate with said contact member for conducting current therefrom directly to said harp.

5. A device for making electrical contact with a trolley wire, including a trolley harp, a reversible mounting pivotally supported on said harp, a contact shoe slidably mounted upon said mounting adapted to make contact with said wire, an auxiliary contact shoe, and a trolley wheel associated therewith in position to engage the trolley wire jointly with said auxiliary shoe upon completion of the reversing movement of said mounting.

In witness whereof, we have hereunto affixed our signatures.

GILES S. MOORE.
OTTO MOORE.